UNITED STATES PATENT OFFICE.

LEWIS H. WITTE, OF CLEVELAND, OHIO.

IMPROVEMENT IN PROCESSES FOR THE MANUFACTURE OF MILK-SUGAR.

Specification forming part of Letters Patent No. 193,436, dated July 24, 1877; application filed May 23, 1877.

*To all whom it may concern:*

Be it known that I, LEWIS H. WITTE, of Cleveland, in the county of Cuyahoga and State of Ohio, have invented certain new and useful Improvements in Processes for the Manufacture of Milk-Sugar; and I do hereby declare the following to be a full, clear, and exact description of the invention, such as will enable others skilled in the art to which it pertains to make and use it, reference being had to the accompanying drawings, which form part of this specification.

My invention relates to a new process for the manufacture of milk-sugar, as hereinafter set forth and claimed.

Heretofore, milk-sugar has been manufactured substantially as follows: Whey left in the manufacture of cheese was boiled down in copper or brass kettles. The heat would coagulate the caseine and albuminous substances, and they would separate, and the large clots would either rise to the top or sink to the bottom, while the fine or small particles would float suspended throughout the liquid. By scraping the bottom the large clots would be raised and strained off, but the fine particles, on account of the great difficulty in straining out, would remain with the sugar of milk produced by evaporation. The dry product left in the kettle was then shipped to the refiners. It was there refined by washing with water, and was then recrystallized; a portion of the milk-sugar was permitted to crystallize upon split clips suspended within. These portions were all of a very good quality. Other portions would collect in flakes or scales upon the sides of the receptacle and form a lower grade.

According to my experience, the larger the quantity of impurities, particularly of caseine or analogous substances in a given bulk of a solution, the smaller would be the crystals of milk-sugar that are obtained, and the smaller the crystals are the greater the loss in washing them.

My improved process consists substantially as follows: I put the whey into shallow iron pans, placing, preferably, two or more of these pans adjacent to each other over the same fire. The object of making the pans shallow is to present greater evaporating surfaces and and a greater heating-surface adjacent to the fire. The object of making them preferably of iron is to prevent any discoloration of the sugar-milk from the metal of brass or copper kettles dissolving or becoming incorporated therewith, in which latter instance such discolored matter must be removed.

The object of placing the pans side by side, or adjacent to each other, is as follows: When heat is applied to the first pan the albuminous matter, caseine, &c., are coagulated, and the large clots are skimmed off, while a portion of the smaller particles can be separated by straining into the next pan, and another portion by straining into the third pan, and so on to the extent desired; considerable, however, remains to be washed out after the formation of crystals of milk-sugar.

In the last pan it is boiled down to a sirupy consistency. This sirupy liquid is then drawn off and allowed to crystallize. The liquid is then drawn off and the crystals are then washed with water before they become dry. They are then ready for the purifying process. To purify them I melt or dissolve the crystals by steam—preferably by injection of steam. The sugar of milk is then permitted to crystallize upon sawed sticks, which are suspended from the cover or other suitable support. The sticks should be long and slender. I use sawed sticks because of their regularity and the facility with which they may be employed. The crystals, so formed, are washed with water before they are dried, and may be recrystallized in the same manner, if not pure enough.

In order that the whey may not readily become sour, I scald it as soon as possible after it is produced, as it is not unfrequently the case that the whey will have to be kept some time before the boiling can be proceeded with. I also prefer, generally, to subject the whey to a preliminary scalding and a subsequent settlement or subsidence before proceeding with the process. This has the effect to separate, and cause to subside within, matter that will not readily strain out.

What I claim is—

1. The process of preparing whey for the manufacture of milk-sugar, consisting in the scalding and subsequent settlement or subsidence of the whey, substantially as described.

2. The process of procuring milk-sugar from whey, consisting of the following steps: first, the boiling or evaporation of the whey by heat (in one or more shallow pans) to reduce it and to separate impurities; second, drawing out the liquor into a separate vessel, where the sugar is permitted to crystallize; third, cleansing the crystals, before they are dried, with water; fourth, remelting or dissolving the crystals, preferably with free steam; fifth, recrystallizing the milk-sugar, substantially as and for the purposes described.

In testimony whereof I have signed my name to this specification in the presence of two subscribing witnesses.

LEWIS H. WITTE.

Witnesses:
FRANCIS TOUMEY,
W. E. DONNELLY.